United States Patent
Wys et al.

(10) Patent No.: US 11,209,053 B2
(45) Date of Patent: Dec. 28, 2021

(54) ELECTROMAGNETIC ACTUATOR FOR WHEEL-END DISCONNECT

(71) Applicant: Ford Global Technologies, LLC, Dearborn, MI (US)

(72) Inventors: Dennis Neil Wys, Ann Arbor, MI (US); Norman Jerry Bird, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 63 days.

(21) Appl. No.: 16/733,972

(22) Filed: Jan. 3, 2020

(65) Prior Publication Data
US 2021/0207663 A1    Jul. 8, 2021

(51) Int. Cl.
| F16D 27/102 | (2006.01) |
| B60K 23/06 | (2006.01) |
| F16D 27/01 | (2006.01) |
| B60K 17/02 | (2006.01) |
| F16D 41/16 | (2006.01) |

(52) U.S. Cl.
CPC ............ F16D 27/102 (2013.01); B60K 17/02 (2013.01); B60K 23/06 (2013.01); F16D 27/01 (2013.01); F16D 41/16 (2013.01)

(58) Field of Classification Search
CPC ........ F16D 27/102; F16D 27/01; F16D 41/16; F16D 27/004; B60K 23/06; B60K 17/02
See application file for complete search history.

(56) References Cited

U.S. PATENT DOCUMENTS

| 5,740,895 | A | | 4/1998 | Bigley |
| 5,765,671 | A | * | 6/1998 | Endo |
| 5,827,148 | A | * | 10/1998 | Seto |
| 2006/0243556 | A1 | * | 11/2006 | Houtman |
| 2014/0354204 | A1 | | 12/2014 | Tachibana et al. |
| 2015/0014116 | A1 | * | 1/2015 | Kimes |
| 2016/0265602 | A1 | | 9/2016 | Pritchard |
| 2018/0038425 | A1 | * | 2/2018 | Kimes |
| 2019/0063513 | A1 | * | 2/2019 | Peglowski |

* cited by examiner

*Primary Examiner* — Mark A Manley
(74) *Attorney, Agent, or Firm* — Vincent Mastrogiacomo; Brooks Kushman P.C.

(57) ABSTRACT

A wheel end disconnect system includes an inner race connected to one of an axle half shaft and a wheel hub, an outer race connected to the other of the axle half shaft and the wheel hub, and a plurality of radially actuatable pawls, circumferentially spaced apart, oriented between the inner and outer races, and movable between an outboard locked position and an inboard unlocked position to connect and disconnect the wheel hub from the axle half shaft. The system further includes a plurality of pins attached to an actuator ring. The actuator ring is axially shift-able between a locked and unlocked position. The system also includes one or more permanent magnets forming a permanent magnet ring attached to the actuator ring, with axially spaced apart north and south poles, and an annular tri-pole electromagnet having two counter-wound axially spaced apart coils concentric with the annular permanent magnet.

17 Claims, 8 Drawing Sheets

ELECTROMAGNETIC ACTUATOR FOR WHEEL-END DISCONNECT

TECHNICAL FIELD

Various embodiments relate to vehicle wheel end disconnects.

BACKGROUND

A vehicle may come in a variety of drive configurations. Vehicles may dynamically desire to change drive configuration based on factors such as speed, load, and slope. An additional factor that may prove beneficial to dynamically change the drive configuration is the current state of the wheel. Multiple driven wheels allow power to be more evenly disbursed, increasing the maximum power of the vehicle, as well greater control of the vehicle. However, driven wheels conventionally have more mass and inertial resistance than non-driven wheels due to equipment used to propel the vehicle. The additional mass and resistance increases the energy consumption required for acceleration and static speed in comparison to a conventional non-driven wheel. Disengaging the mass and resistance of the wheel while in a non-driven state may improve energy consumption. Engaging the driving equipment of the wheel allows for more disbursed power on command.

Certain previous attempts to dynamically engage and disengage driving equipment between the wheel and drivetrain used vacuums and clutches. The vacuum system of the disconnect was used in concert with a vacuum system of the vehicle. However, many vehicles are now being developed as vacuum-less.

Other attempts to dynamically engage and disengage driving equipment between the wheel and drivetrain used axial actuatable pawls between the wheel hub and half shaft. However, this method may provide disproportionate stress to sections of either the half shaft or wheel hub.

SUMMARY

A wheel end disconnect system includes an inner race connected to one of an axle half shaft and a wheel hub, an outer race connected to the other of the axle half shaft and the wheel hub, the inner and outer races being concentric about a wheel axis, and a plurality of radially actuatable pawls, spaced apart, and oriented between the inner and outer races, movable between an outboard locked position, and an inboard unlocked position to connect and disconnect the wheel hub from the axle half shaft. The system further includes a plurality of pins, circumferentially spaced apart, and attached to an actuator ring, the pins having ends cooperating with the plurality of pawls to move them between the locked and unlocked positions. The actuator ring is axially shift-able between a locked and unlocked position. The system also includes one or more permanent magnets forming a permanent magnet ring attached to the actuator ring, with axially spaced apart north and south poles, and an annular tri-pole electromagnet having two counter-wound axially spaced apart coils concentric with the annular permanent magnet. Energizing the tri-pole electromagnet with a positive current shifts the permanent magnet ring and actuator ring in a first direction, and energizing the tri-pole electromagnet with a negative current shifts the permanent magnet ring and actuator ring in an opposite direction, causing the pawls to move between the locked and unlocked positions.

A wheel end disconnect system includes coaxially nested inner and outer races each connected to one of an axle half shaft and a wheel hub for rotation about a wheel axis, a plurality of radially actuatable pawls, circumferentially spaced apart, and oriented between the inner and outer races, movable between a locked position and an unlocked position, to connect and disconnect the wheel hub from the axle half shaft, and an actuator ring axially shift-able relative to the inner and outer races between a locked and unlocked position. The system further includes a plurality of pins, circumferentially spaced apart, and attached to the actuator ring, the pins having ends cooperating with the plurality of pawls to move the pins between the locked and unlocked positions, an annular permanent magnet ring attached to the actuator ring, having axially spaced apart north and south poles, and an annular tri-pole electromagnet having two axially spaced part coils concentric with the annular permanent magnet ring. Energizing the tri-pole electromagnet with a positive current shifts the permanent magnet ring and actuator ring in a first direction, and energizing the tri-pole electromagnet with a negative current shifts the permanent magnet ring and actuator ring in an opposite direction, causing the pawls to move between the locked and unlocked positions.

A wheel end disconnect system includes an inner race connected to an axle half shaft, an outer race connected to a wheel hub concentric with the inner race and a wheel axis, a plurality of radially actuatable pawls, circumferentially spaced apart, and oriented between the inner and outer races, movable between an outboard locked position, and an inboard unlocked position, and a non-permeable actuator ring axially shift-able between a locked and unlocked position. The system further includes a plurality of pins, circumferentially spaced apart, and attached to the actuator ring, the pins having ends cooperating with the plurality of pawls to move them between the locked and unlocked positions, and an annular permanent magnet ring attached to the actuator ring, with axially spaced apart north and south poles. The system also includes an annular tri-pole electromagnet having two counter-wound axially spaced part coils concentric with the annular permanent magnet ring, and a ferrous tri-pole flux guide comprised of a plurality of co-axially connected ferrous laminate discs defining two inwardly opening annular axially spaced apart cavities sized to receive the two counter-wound axially spaced apart coils and defining three axially spaced apart flux rings oriented between and at axial ends of the coils, when coils are energized in one direction the flux rings form N-S-N poles and when energized in the opposite direction S-N-S poles, to shift the permanent magnet ring and actuator ring causing the pawls to move between the locked and unlocked positions to connect and disconnect the wheel hub from the axle half shaft.

DETAILED DESCRIPTION

Various embodiments of the present disclosure are described herein. However, the disclosed embodiments are merely exemplary and other embodiments may take various and alternative forms that are not explicitly illustrated or described. The figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. However, various combinations and modifications of the features consistent with the teachings of this disclosure may be desired for particular applications or implementations.

Figure 1:
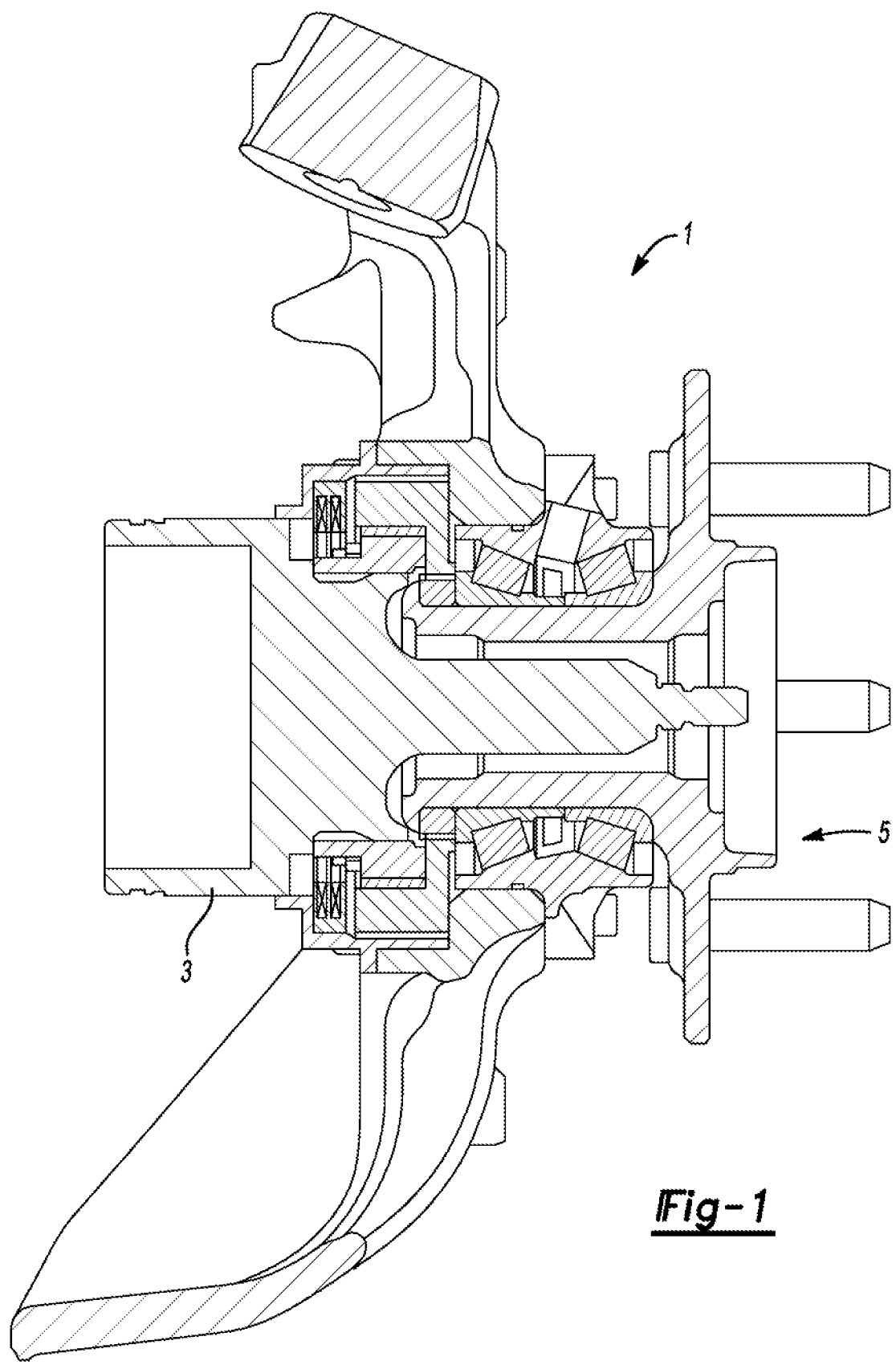
FIG. 1 shows a configuration for a driven wheel.

Referencing FIG. 1, the system may be used for disconnection of a wheel end during periods when the wheel is not being driven. The wheel end disconnect 1 may contain a half shaft 3, and wheel hub 5. The wheel hub 5 may be connected to a wheel assembly, wherein the wheel assembly is driven to propel the vehicle.

The half shaft 3 may be driven by a drivetrain. The drivetrain may be driven by an internal combustion engine, an electric motor connected to a traction battery, or a combination of the two.

Figure 2:
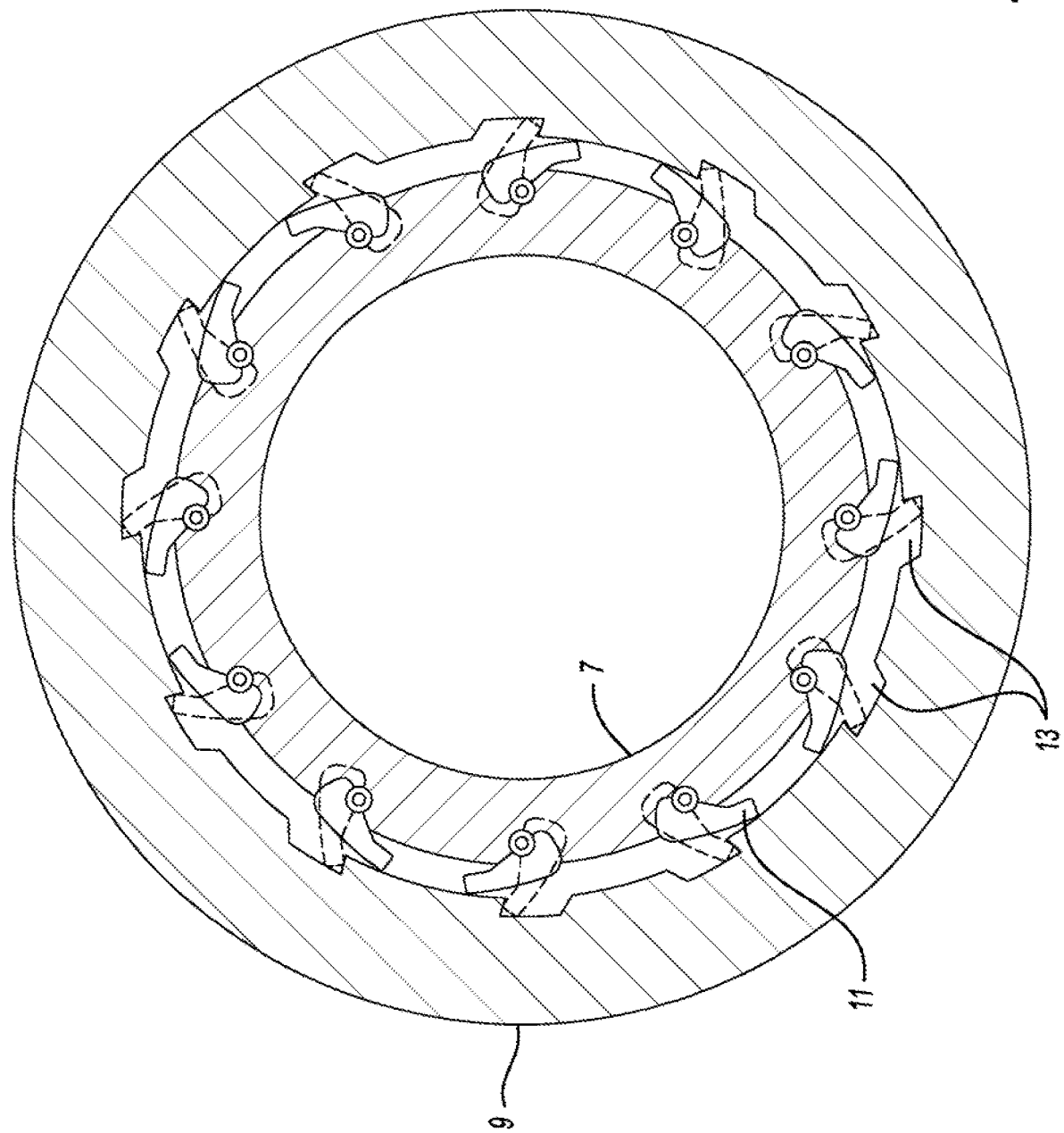
FIG. 2 shows an overview of an embodiment of the electromagnetic actuator for wheel-end disconnect.

Referencing FIG. 2, an inner race 7 may be attached to the half shaft 3. The inner race 7 may contain a plurality of pawls 11. The pawls 11 may be circumferentially spaced apart, axially spaced apart, or a combination of both. The pawls 11 may be actuatable between a first position and a second position. For example, the first position may be generally tangent to the outer surface of the inner race 7, and the second position may be an acute angle to the surface of the inner race 7. A plurality of pawl chambers 13 may be formed through the outer race 9. The chambers 13 may provide accessibility to an actuation mechanism for the pawls 11. The pawls 11 may be radially actuated to cooperate with chambers 13.

The inner race 7 may cooperate with the outer race 9. The pawls 11 of the inner race 7 may cooperate with the cavities of the outer race 9 to mechanically join the inner race 7 to the outer race 9. When joined, the races 7, 9 may cooperate to couple and rotationally synch the half shaft 3 and the wheel hub 5.

Figure 3:
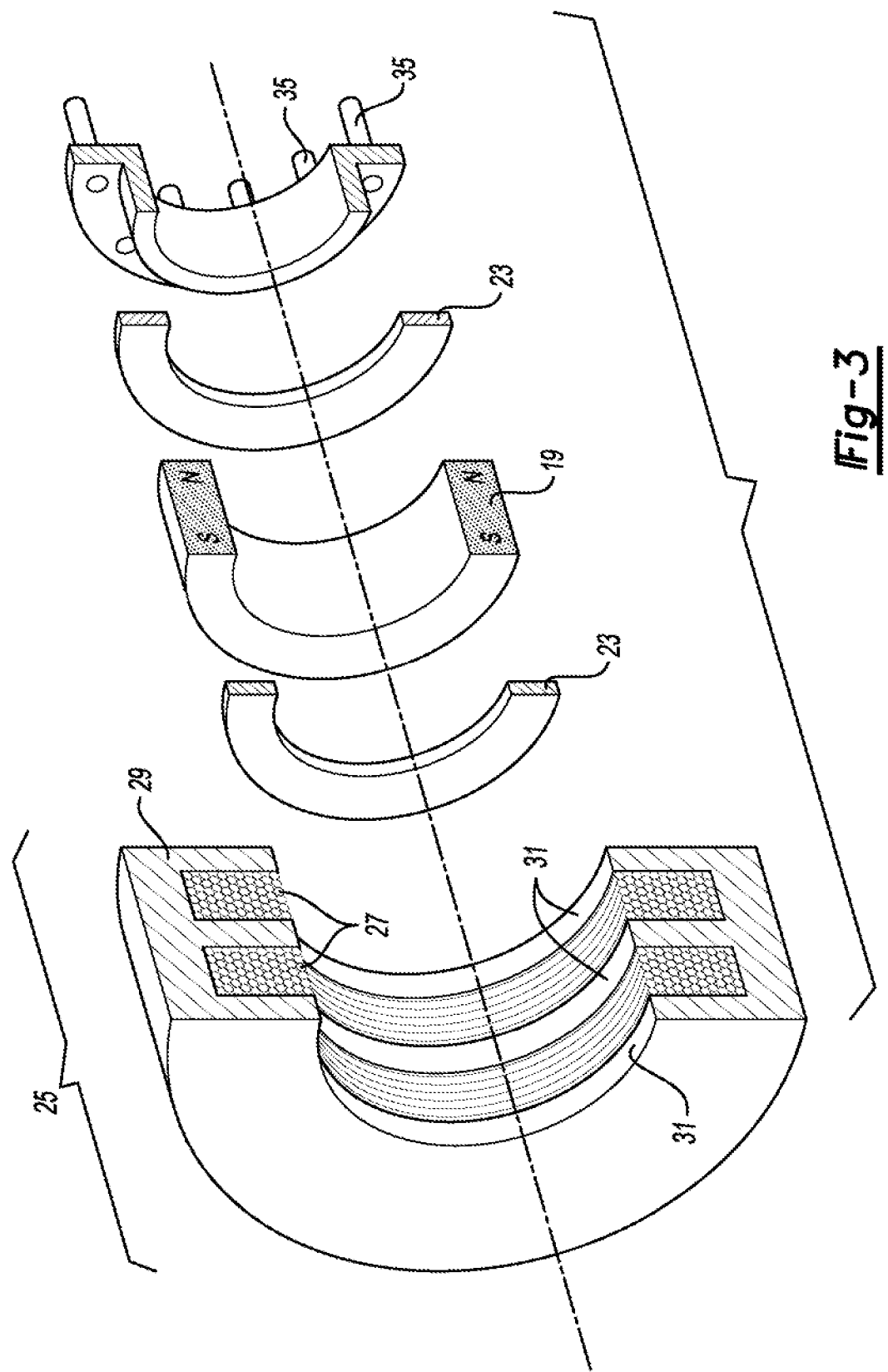
FIG. 3 shows an exploded image of magnet assemblies, actuator ring, and pins.
Figure 4:
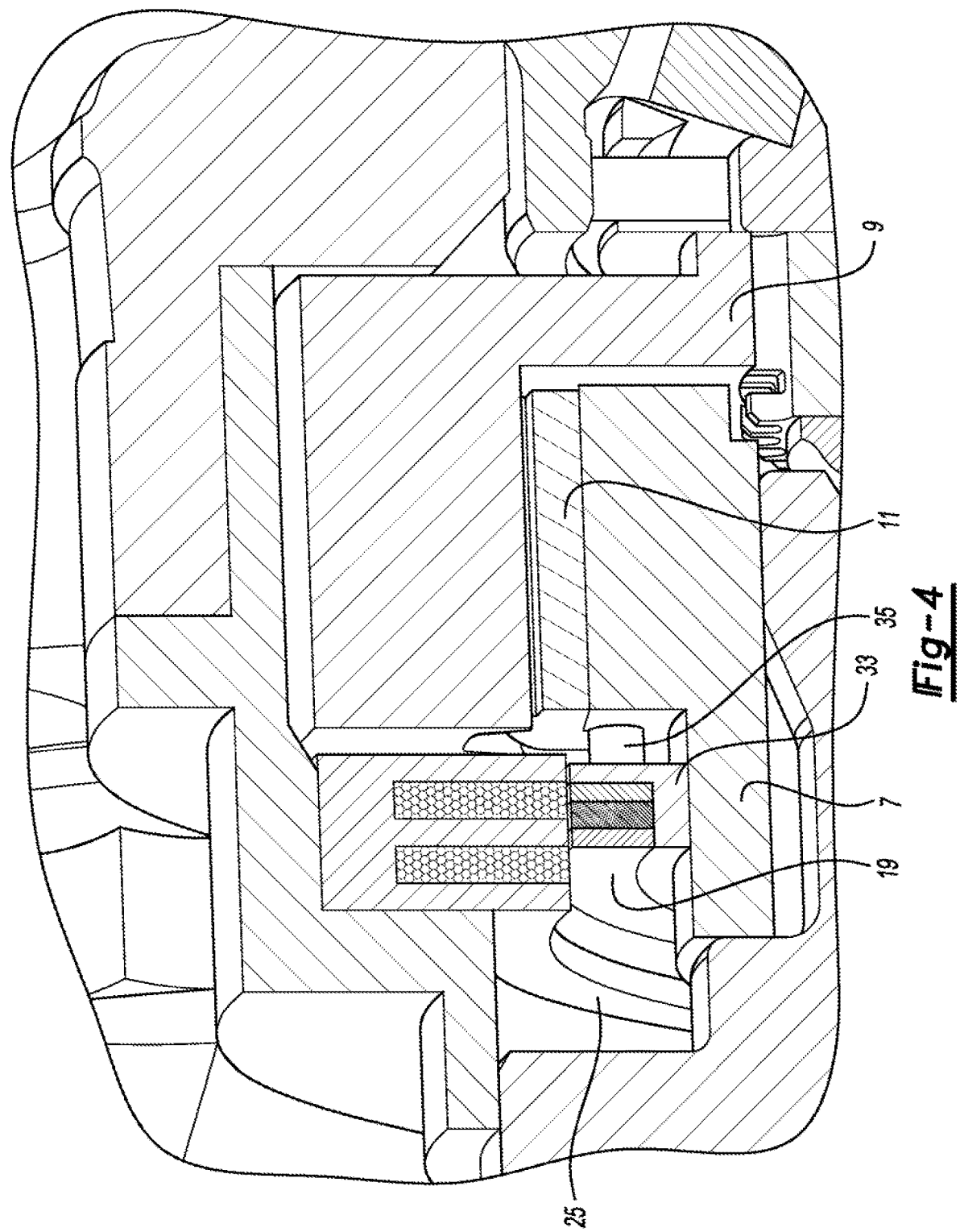
FIG. 4 shows the cooperation of the pins and cavities of the device.
Figure 5A:
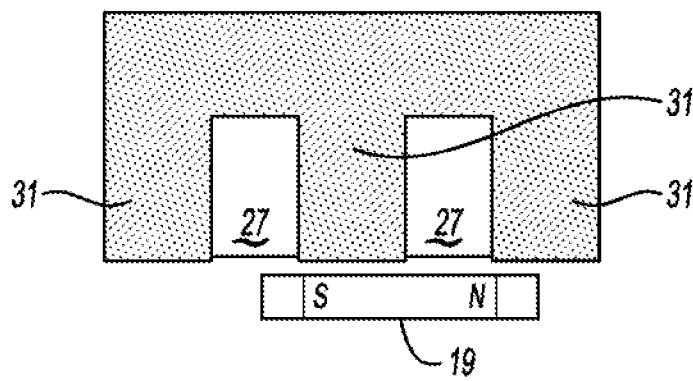
FIGS. 5A, 5B, 5C, and 5D show the behavior and path of the magnet assemblies.
Figure 5B:
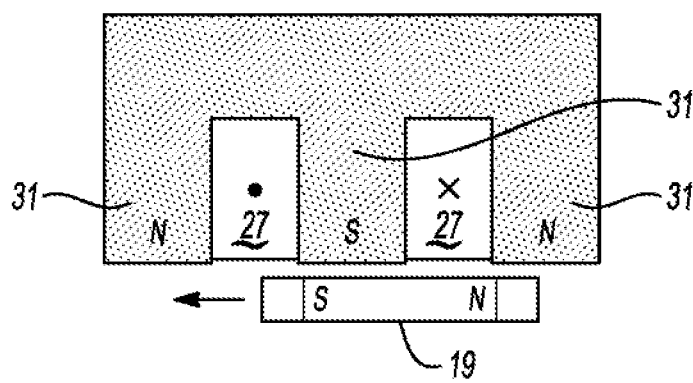
Figure 5C:
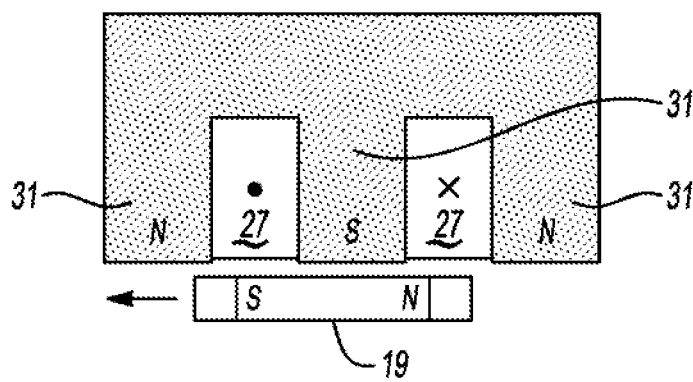
Figure 5D:
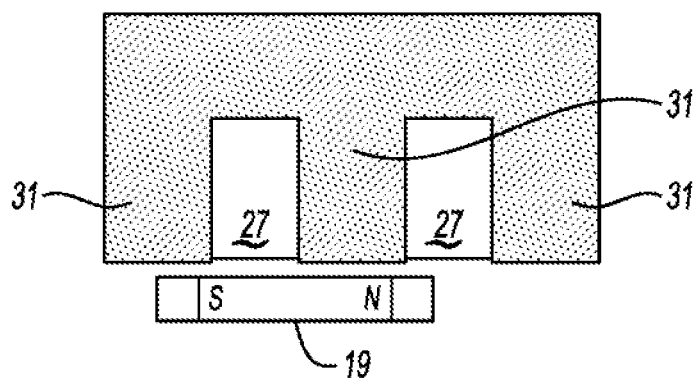

Referencing FIGS. 3 and 4, certain arrangements may contain an annular permanent magnet assembly 19. The permanent magnet assembly 19 may contain a plurality of cylindrical permanent magnets, arranged or contained in an annular structure. In alternate embodiments, the permanent magnet assembly 19 may be comprised of a single annular permanent magnet or multiple sections of an annular shape that when joined comprise an annular ring. The permanent magnet assembly 19 may be oriented to have its poles on the axial ends of the annular shape.

A pair of pole rings 23 may be contained in the permanent magnet assembly 19. In alternate embodiments, the permanent magnet assembly 19 may contain a single pole ring or no pole ring at all. The pole ring may be shaped as a ring with substantially similar circumference as the permanent magnet assembly 19. The pole rings 23 may be composed of ferrous material. For example, the pole rings 23 may be composed of steel.

Certain arrangements may contain an annular electromagnet assembly 25. A plurality of coils 27 may be contained in the electromagnet assembly 25. The coils 27 may be composed of an electrically conductive material. For example, the coils 27 may be composed of copper. The coils 27 may be in counter-wound electrical communication. In alternate embodiments, the coils 27 may be electrically independent.

The electromagnet assembly 25 may have a flux guide 29. The flux guide 29 may be composed of ferrous material. The flux guide 29 may be in electromagnetic communication with the coils 27. The flux guide 29 may assist the propagation of electromagnetic flux produced by current flowing through the plurality coils 27 by providing a material with a higher permeability than the surrounding media. A plurality of flux rings 31 may be contained in the flux guide 29. The flux rings 31 may further assist propagation of electromagnetic flux. The flux rings 31 may be axially spaced apart forming a channel in which the coils 27 may be disposed. For example, there may be three flux rings 31 defining two channels in which two counter-wound coils 27 are disposed.

When activated, the coils 27 may produce a polar magnetic configuration among the inner radial edge of the plurality of flux rings 31. For example, when the coils 27 are energized with positive electrical current, the flux rings 31 may be configured to have a north—south—north (NSN) configuration. Therefore, when the coils 27 are energized with a negative electrical current, the flux rings 31 may be configured to have a SNS configuration. In this configuration, when energized, the center flux ring may produce greater electromagnet flux than an adjacent flux ring, as both coils 27 are providing energy to power the electromagnetic field of the central flux ring.

The permanent magnet assembly 19 and the electromagnet assembly 25 may be generally positioned concentrically. The electromagnet assembly 25 may be in electromagnetic communication with the permanent magnet assembly 19. The permanent magnet assembly 19 may be axially actuatable between a first position and a second position.

When the electromagnet assembly 25 is not energized, the permanent magnet assembly 19 may apply a magnetic holding force via the pole rings 23 between the permanent magnet assembly 19 and the electromagnet assembly 25 via the flux rings 31 at either the first or second position. The holding force may be used to secure the permanent magnet assembly 19 at the first or second position and inhibit actuation of the permanent magnet assembly 19 to the other of the first or second position. When the electromagnet assembly 25 is energized, the electromagnet assembly 25 may apply a moving force to actuate the permanent magnet assembly 19 between the first and second positions. The moving force may be stronger than the holding force, to cause initial movement. The holding force may provide a lesser degree of influence during actuation of the permanent magnet assembly 19 than during secured positioning. In alternate embodiments, the electromagnet assembly 25 may be actuated.

Certain arrangements may contain an actuator ring 33. The actuator ring 33 may be used to contain the permanent magnet assembly 19. In alternate embodiments, the actuator ring 33 may be used to contain the electromagnet assembly 25. Actuation of the permanent magnet assembly 19 may cause actuation of the actuator ring 33 between the first and second positions.

Referencing FIG. 4, a plurality of pins 35 may be contained in the actuator ring 33. The actuator ring 33 may be slidably connected to the inner race 7 by way of disposing the pins 35 inside chambers of the inner race 7. The pins 35 by way of the actuator ring 33, may be capable of actuating between the first and second positions. Actuation of the pins 35 may cause actuation of the pawls 11 of the inner race 7. Therefore, actuation of the permanent magnet assembly 19 may join or disjoin the half shaft 3 and the wheel hub 5.

Referencing FIGS. SA, 5B, SC, and SD, the spatial relationship of the permanent magnet assembly 19 and electromagnet assembly 25 may be such that the plane of the pole rings 23 of the permanent magnet assembly 19 may never cross or occupy the plane of the outer flux rings 31. For example, an axial surface of the pole rings 23 may not be flush with the axial surface of the outer flux guide 29 although the holding force may be influencing the two to hold the magnets in the first or second position. This orientation allows the moving force to bias the direction of the actuation.

Figure 6A:
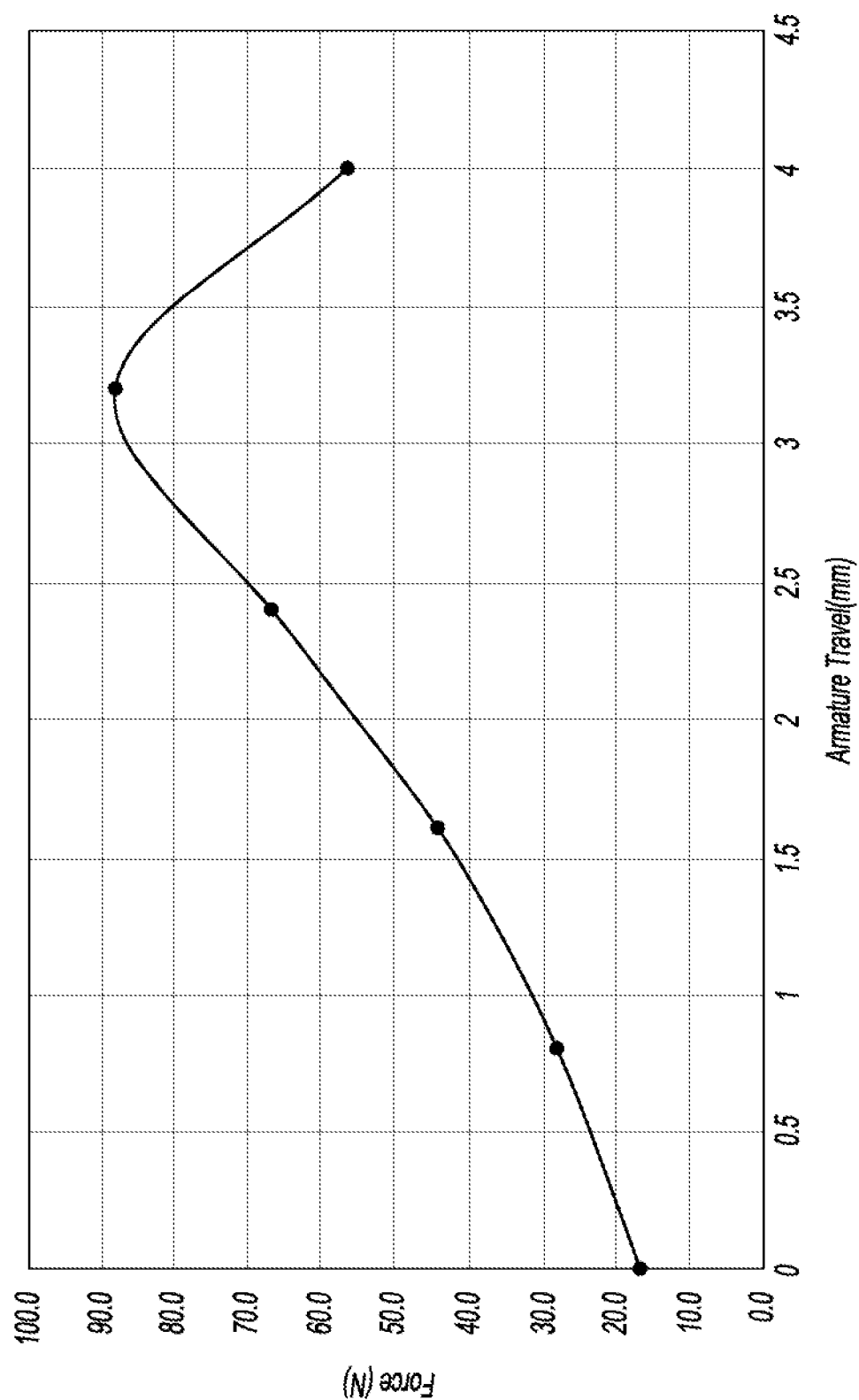
FIGS. 6A, 6B, and, 6C show the electromagnet force values by position between the magnet assemblies.
Figure 6B:
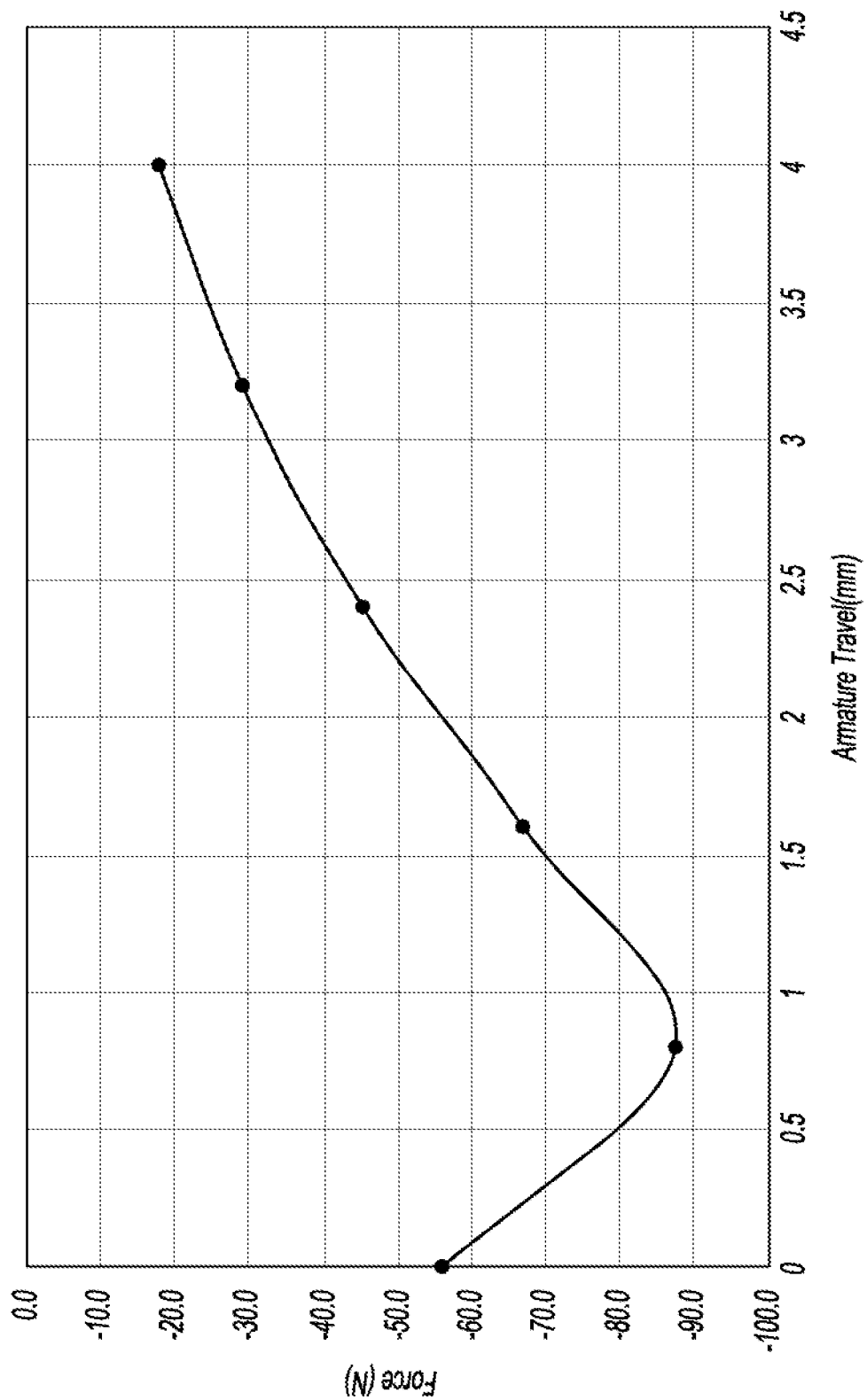
Figure 6C:
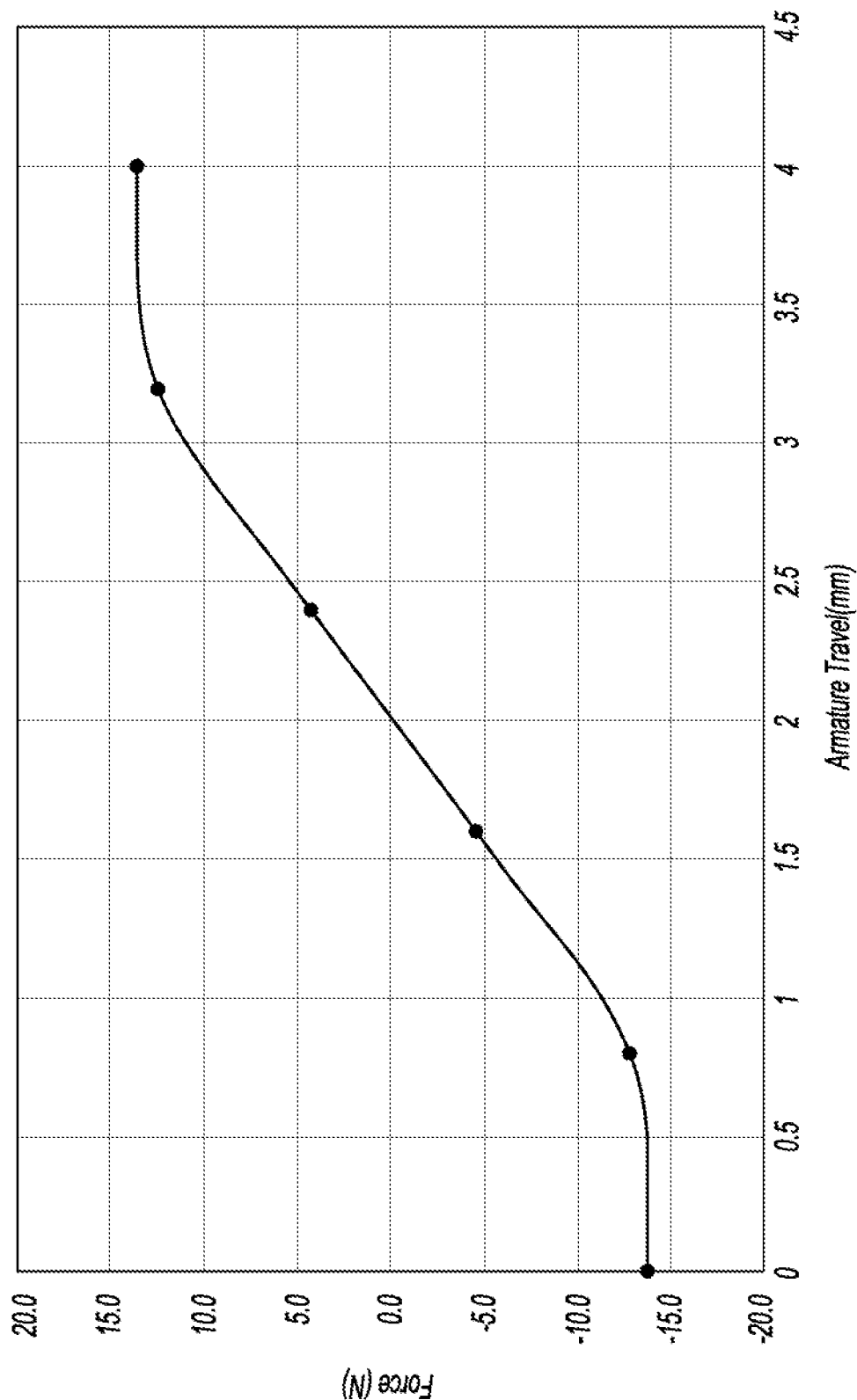

Referencing FIGS. 6A, 6B, and 6C, the force behaviors between the permanent magnet and the electromagnet are displayed. FIG. 6A displays the force behavior between the magnets when current is flowing through the coils, creating a magnetic flux though the flux rings such that the pole of the permanent magnet disposed at 0 mm is matched to the pole of the adjacent flux ring. At the initiation of electrical current through the coils, a force of 20 newtons may be applied between the magnets. 20 newtons may be the sum of the force from all interactions between the permanent magnet and the flux rings due to electrical current. A portion of the force between the magnets is due to both the flux ring being disposed at 0 mm and the central flux guide pushing the biased matching poles away. As the permanent magnet assembly begins to travel, the amount of force increases. The increase in force may be attributed to the flux guide being disposed at 4 mm beginning to have a stronger influence in pulling the opposite pole of the permanent magnet, as well as the central flux guide beginning to pull the opposite pole of the permanent magnet. These effects may peak between 80 and 90 newtons at a distance between 3 and 3.5 mm. The effect of the forces may then again weaken. This may be attributed to the flux guide at 0 losing pushing influence on the matching pole as the magnet travels farther away. The strength of the force between the magnets may drop to a value between 50 and 60 newtons when the permanent magnet has traveled 4 mm.

FIG. 6B displays the force behavior between the magnets when electrical current is flowing through the coils in an opposite direction than in FIG. 6A, creating a magnetic flux through the flux rings such that the pole of the permanent magnet disposed a 4 mm is matched to the pole of the adjacent flux ring. At the initiation of electrical current through the coils, a force of 20 newtons may be applied between the magnets. 20 newtons may be the sum of force from all interactions between the permanent magnet and the flux rings due to electrical current. A portion of the force between the magnets is due to both the flux ring being disposed at 4 mm, and the central flux guide pushing the biased matching poles away. As the permanent magnet assembly begins to travel, the amount of force decreases. The decrease in force may be attributed to the flux guide being disposed at 0 mm beginning to have a stronger influence in pulling the opposite pole of the permanent magnet, as well as the central flux guide beginning to pull the opposite pole of the magnet. These effects may valley between −80 and −90 newtons at a distance between 0.5 and 1 mm. The effect of the forces may then again strengthen. This may be attributed to the flux guide at 4 mm losing pushing influence on the matching pole as the magnet travels farther away. The strength of the force between the magnets may rise to a value between −50 and −60 newtons when the permanent magnet has traveled to 0 mm.

FIG. 6C displays the force behavior between the magnets when no electrical current is flowing through the coils. The output of the chart displays the holding force between the permanent magnet and the flux guide. At 0 mm, the force between the magnets may be between −10 and −15 newtons. Therefore, a force of 20 newtons will shift the permanent magnet assembly in the opposite direction. At 4 mm, the force between the magnets may be between 10 and 15 newtons. Therefore, a force of −20 newtons will shift the permanent magnet assembly in the opposite direction. At 2 mm, the force between the magnets may be substantially 0 newtons. Generally, this is not a stopping point for the permanent magnet. The shape of the graph connecting the points may resemble a cube root function.

The words used in the specification are words of description rather than limitation, and it is understood that various changes may be made without departing from the spirit and scope of the disclosure and claims. As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A wheel end disconnect system comprising:
an inner race connected to one of an axle half shaft and a wheel hub;
an outer race connected to the other of the axle half shaft and the wheel hub, the inner and outer races being concentric about a wheel axis;
a plurality of radially actuatable pawls, circumferentially spaced apart, oriented between the inner and outer races, and movable between an outboard locked position and an inboard unlocked position to connect and disconnect the wheel hub from the axle half shaft;
a plurality of pins, circumferentially spaced apart, and attached to an actuator ring, the pins having ends cooperating with the plurality of pawls to move them between the locked and unlocked positions, and the actuator ring being axially shift-able between the locked and unlocked position;
a plurality of cylindrical permanent magnets radially arranged around a central axis of, and forming a permanent magnet ring attached to, the actuator ring, with axially spaced apart north and south poles; and an annular tri-pole electromagnet having two counter-wound axially spaced apart coils concentric with the annular permanent magnet, wherein energizing the tri-pole electromagnet with a positive current shifts the permanent magnet ring and actuator ring in a first direction and energizing the tri-pole electromagnet with a negative current shifts the permanent magnet ring and actuator ring in an opposite direction, causing the pawls to move between the locked and unlocked positions.

2. The wheel end disconnect system of claim 1, wherein the tri-pole electromagnet further comprises a ferrous tri-pole flux guide defining three axially spaced apart flux rings forming axially spaced apart N-S-N or S-N-S poles.

3. The wheel end disconnect system of claim 2, wherein the permanent magnet ring is provided with a pair of axially spaced apart ferrous pole rings attached to the axial ends of the permanent magnet ring.

4. The wheel end disconnect system of claim 3, wherein the permanent magnet ring, when in the locked or unlocked position, is offset relative to the adjacent flux ring so that the permanent magnet is biased to the locked or unlocked position when the electromagnet is not energized.

5. The wheel end disconnect system of claim 4, wherein when the tri-pole electromagnet is energized to move the permanent magnet ring to the other position, a net axial force of greater than 15 N is exerted on the permanent magnet ring.

6. The wheel end disconnect system of claim 5, wherein the permanent magnet ring, when cooperating with the adjacent flux rings in one of the locked or unlocked position with the electromagnet in an unenergized state, exhibits an axial holding force of between 8 and 12 N.

7. The wheel end disconnect system of claim 4, wherein the permanent magnet ring, when cooperating with the adjacent flux rings in one of the locked or unlocked position with the electromagnet in an unenergized state, exhibits an axial holding force of between 8 and 12 N.

8. The wheel end disconnect system of claim 2, wherein the tri-pole flux guide is comprised of a plurality of axially connected coaxial ferrous rings defining two inwardly opening annular axially spaced apart cavities sized to receive the two counter-wound axially spaced apart coils.

9. The wheel end disconnect system of claim 8, wherein the ferrous rings are comprised of steel.

10. The wheel end disconnect system of claim 4, wherein when the tri-pole electromagnet is energized to move the permanent magnet ring to the other position, an axial force is exerted on the permanent magnet ring, sufficient to overcome the bias force the permanent magnet ring exerts on the tri-pole flux ring, causing the electromagnet to shift the position of the permanent magnet ring and actuator ring.

11. The wheel end disconnect system of claim 1, wherein the actuator ring is formed of a non-permeable material.

12. A wheel end disconnect system comprising:
coaxially nested inner and outer races each connected to one of an axle half shaft and a wheel hub for rotation about a wheel axis;
a plurality of radially actuatable pawls, circumferentially spaced apart, oriented between the inner and outer races, and movable between a locked position and an unlocked position to connect and disconnect the wheel hub from the axle half shaft;
an actuator ring axially shift-able relative to the inner and outer races between the locked and unlocked positions;
a plurality of pins, circumferentially spaced apart, and attached to the actuator ring, the pins having ends cooperating with the plurality of pawls to move the pins between the locked and unlocked positions;
a plurality of cylindrical permanent magnets radially arranged around a central axis of, and forming a permanent magnet ring attached to, the actuator ring and having axially spaced apart north and south poles; and
an annular tri-pole electromagnet having two axially spaced part coils concentric with the permanent magnet ring, wherein energizing the tri-pole electromagnet with a positive current shifts the permanent magnet ring and actuator ring in a first direction, and energizing the tri-pole electromagnet with a negative current shifts the permanent magnet ring and actuator ring in an opposite direction, causing the pawls to move between the locked and unlocked positions.

13. The wheel end disconnect system of claim 12, wherein at least one of the poles of the permanent magnet ring when in the locked or unlocked position is offset relative to the adjacent pole of the tri-pole electromagnet to axially bias the permanent magnet ring when the tri-pole magnet is energized to move to the other position.

14. The wheel end disconnect system of claim 13, wherein when the tri-pole magnet is energized to move the permanent magnet ring to the other position, an axial force of greater than 15 N is exerted on the permanent magnet ring to overcome the axial force the permanent magnet ring exerts on the tri-pole flux ring when the electromagnet is in an unenergized state.

15. The wheel end disconnect system of claim 14, wherein the permanent magnet ring, in the locked and unlocked positions, exerts a holding force between 8 and 12 N on the tri-pole flux ring when the electromagnet is in an unenergized state.

16. A wheel end disconnect system comprising:
an inner race connected to an axle half shaft;
an outer race connected to a wheel hub concentric with the inner race and a wheel axis;
a plurality of radially actuatable pawls, circumferentially spaced apart, oriented between the inner and outer races, and movable between an outboard locked position and an inboard unlocked position;
a non-permeable actuator ring axially shift-able between the locked and unlocked positions;
a plurality of pins, circumferentially spaced apart, and attached to the actuator ring, the pins having ends cooperating with the plurality of pawls to move the pins between the locked and unlocked positions;
a plurality of permanent magnets arranged in an annular structure that is attached to the actuator ring, with axially spaced apart north and south poles; and
an annular tri-pole electromagnet having two counter-wound axially spaced part coils concentric with the annular structure, and a ferrous tri-pole flux guide comprised of a plurality of co-axially connected ferrous laminate discs defining two inwardly opening annular axially spaced apart cavities sized to receive the two counter-wound axially spaced apart coils and defining three axially spaced apart flux rings oriented between and at axial ends of the coils, when coils are energized in one direction the flux rings form N-S-N poles and when energized in the opposite direction S-N-S poles, to shift the annular structure and actuator ring causing the pawls to move between the locked and unlocked positions to connect and disconnect the wheel hub from the axle half shaft.

17. The wheel end disconnect system of claim 16, wherein when the tri-pole magnet is energized to move the annular structure to the other position, an axial force of greater than 15 N is exerted on the annular structure to overcome the axial force, between 8 and 12 N, the annual structure exerts on the tri-pole flux ring when the electromagnet is in an unenergized state.

* * * * *